C. C. HANSEN.
AUTOMATIC CONTROL.
APPLICATION FILED OCT. 17, 1917.
1,311,346.
Patented July 29, 1919.
2 SHEETS—SHEET 1.
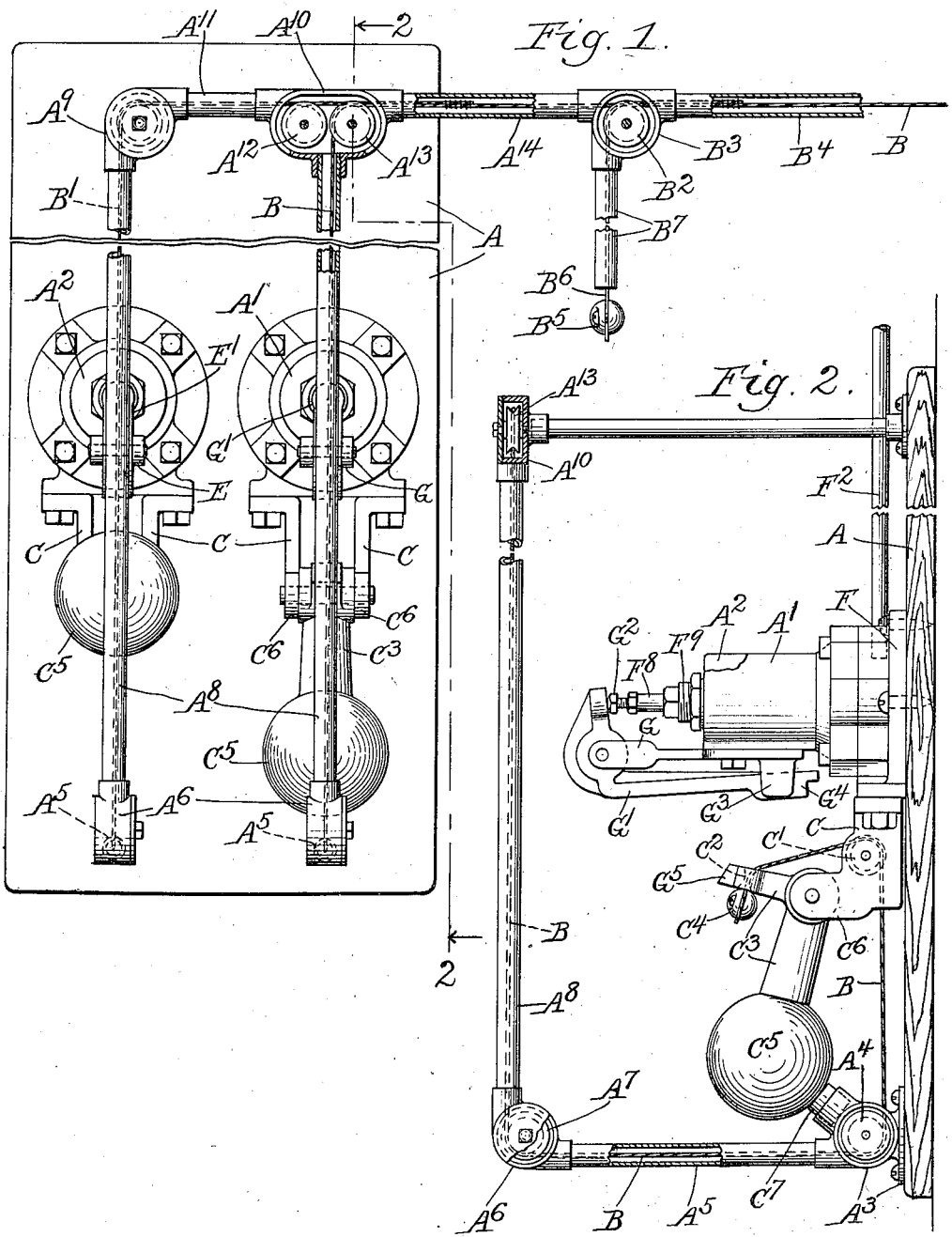
Witnesses.
Edward F. Wray.
Marion Ingraham.
Inventor.
Charles C. Hansen.
by Parker & Carter
Attorneys.

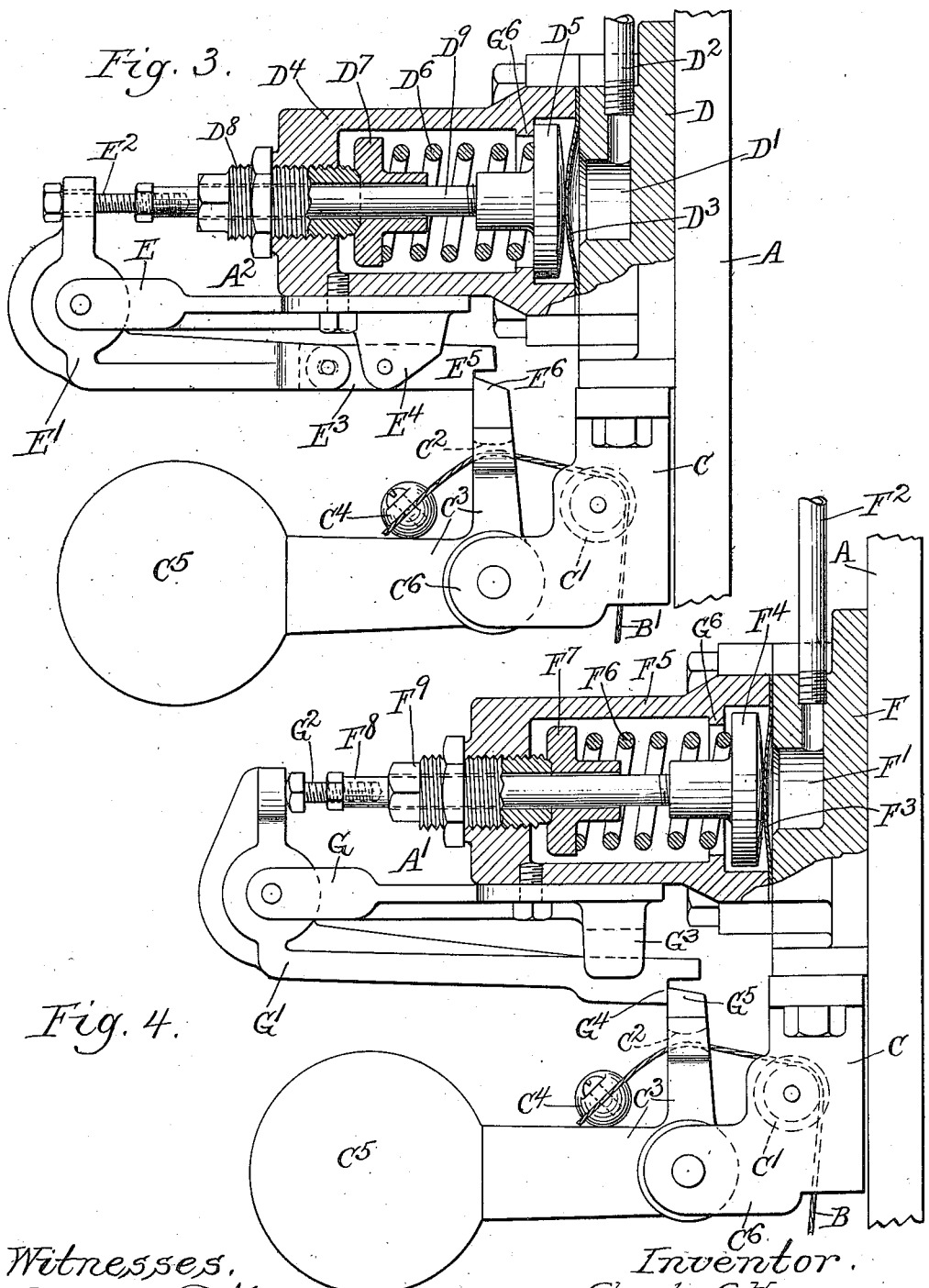

UNITED STATES PATENT OFFICE.

CHARLES C. HANSEN, OF CHICAGO, ILLINOIS, ASSIGNOR TO REFRIGERATING SPECIALTIES COMPANY, OF CHICAGO, ILLINOIS, A CORPORATION OF ILLINOIS.

AUTOMATIC CONTROL.

1,311,346.  Specification of Letters Patent.  Patented July 29, 1919.

Application filed October 17, 1917. Serial No. 197,098.

*To all whom it may concern:*

Be it known that I, CHARLES C. HANSEN, a citizen of the United States, residing at Chicago, in the county of Cook and State of Illinois, have invented a certain new and useful Improvement in Automatic Controls, of which the following is a specification.

My invention relates to improvements in automatic controls for automatically controlling and protecting pressure systems or systems wherein fluid pressures may be subject to abnormal and dangerous variations. My invention is particularly well adapted for use in connection with refrigerating machinery wherein it is desirable to close a valve or stop a motor or make some other change in the system responsive to and immediately upon the occurrence of any abnormal change in pressure and I provide means for making the response and effecting the control upon an abnormal increase as well as upon an abnormal decrease.

My apparatus may be used to manipulate a valve to start or stop a motor or to effect any other desired result and I have shown only that part of my apparatus which forms the subject matter of the present invention and provides the motive force or power for operating the valve or controlling the power or producing the controlled result.

My invention is illustrated more or less diagrammatically in the accompanying drawings wherein I have shown an installation which might be applied to a refrigerating system and wherein,—

Figure 1 is a front elevation of the control panel with parts in section;

Fig. 2 is a side elevation of Fig. 1 showing a part section along the line 2—2 of Fig. 1;

Fig. 3 is a section on an enlarged scale through a part of the low pressure control;

Fig. 4 is a section on an enlarged scale through a part of the high pressure control;

Like parts are indicated by like figures in all the drawings.

A is a panel adapted to be mounted in any suitable position. It carries on its face a high pressure control $A^1$ and a low pressure control $A^2$ adapted to be connected to the pressure system in any suitable way. Arranged beneath each of the pressure controls are brackets $A^3$ containing sheaves $A^4$. Projecting downwardly from these brackets along lines tangential with such sheaves are conduits $A^5$ terminating in elbows $A^6$ containing sheaves $A^7$. Extending upwardly from these elbows are conduits $A^8$. One of these conduits terminates in a sheave containing elbow $A^9$, the other in a T $A^{10}$. This T $A^{10}$ is connected with the elbow $A^9$ by means of a conduit $A^{11}$ and contains two sheaves $A^{12}$, $A^{13}$, and communicates with a conduit $A^{14}$.

Wires or cords B, $B^1$ extend from the brackets $A^3$ through the conduits and about the sheaves. They are joined together in the conduit $A^{14}$ where the cord $B^1$ terminates. The cord B passes on across a sheave $B^2$ in a T $B^3$ out through a conduit $b^4$ to any suitable point where it may be connected to any suitable apparatus which it is desired the mechanism will control. $B^5$ is a hand control ball communicating with a cord $B^6$ extending through a conduit $B^7$. It passes over the T $B^3$ and is joined to the cord B somewhere in the conduit $B^4$. Obviously the pull on any one of the three cords B, $B^1$ and $B^6$ will result in the movement of the apparatus to which the end of the cord system is attached and this pull may be exerted on any one of the cords or on a plurality of them simultaneously without the operation of any one of them being hindered by any other.

C, C are brackets bolted to each of the two members $A^1$, $A^2$. They are exactly the same in each case. These brackets each have a sheave $C^1$ about which the cord B or $B^1$, as the case may be, travels. This cord passes through a hole $C^2$ in one end of a bell-crank lever $C^3$ and terminates in a ball $C^4$ too large to pass through the hole. This bell-crank lever is provided at its free end with a very heavy weight $C^5$ and is pivoted on the bracket $C^6$ projecting forwardly from the bracket C. Mounted on the bracket $A^3$ is a yielding stop $C^7$ adapted to catch and arrest the downward movement of the weight on the end of the lever. The parts are arranged as shown so that when the weight commences its downward movement it does not at first exert a tension upon the cord. It is only after the movement is started and the cord has been drawn out through the hole in the lever for some distance that the ball $C^4$ is engaged by the lever and the momentum of the weight or ball $C^5$ gives a sharp jerk on the cord, thus operating the safety appliance. It is understood that means are provided in each case for the holding of the bell-crank lever in the upper position ready to drop.

Referring first to the low pressure release shown in Fig. 3, D is a base mounted on the panel A. It contains a pressure chamber $D^1$ communicating by means of a pipe $D^2$ with the pressure system. This pressure chamber is closed by a flexible impervious diaphragm $D^3$ which is held in position by a housing or cap $D^4$ which is bolted to the base. This housing or cap $D^4$ contains a plunger $D^5$ engaging the diaphragm and thrust against it by a spring $D^6$ which spring engages the plunger at one end and a stop $D^7$ at the other which stop may be adjusted toward and from the plunger to vary the tension of the spring by means of a screw threaded plug $D^8$ engaging the stop. $D^9$ is a plunger rod passing outwardly from the plunger through the spring, the stop and the plug. The plunger $D^5$ is held by the pressure in the chamber $D^1$ in the position shown in Fig. 3. As soon as the pressure lowers in the chamber $D^1$, and this represents an abnormal condition in the pressure line, the spring $D^6$ forces the plunger inwardly carrying with it the plunger rod.

E is a bracket rigidly mounted on the housing $D^4$. Rotatably mounted on this bracket is a bell-crank lever $E^1$ one end of which is connected by means of an adjustable screw $E^2$ with the end of the plunger rod $D^9$, the other end is pivoted by a loose joint connection with one end of a lever $E^3$ which lever is rotatably mounted on ears $E^4$ projecting outwardly from the bracket E. This lever is provided with a locking end $E^5$ adapted to engage the cut-away end $E^6$ of the bell-crank lever $C^2$ whereby when the pressure drops off in the chamber $D^1$ the spring may be permitted to move the piston inwardly, rotate the lever $E^1$ in a clockwise direction and rotate the lever $E^3$ in a counter clockwise direction thus releasing the latch, permitting the lever $C^5$ to pull the cable to operate the safety device.

Referring now to the excess pressure release in Fig. 4, F is a base mounted on the panel A containing a pressure chamber $F^1$ in communication with the pipe $F^2$. This pressure chamber is closed by the diaphragm $F^3$ against which rests a plunger $F^4$ in the housing $F^5$, the plunger being held against the diaphragm by a spring $F^6$ abutting one end against the plunger, the other against the stop $F^7$. $F^8$ is a plunger rod passing through the stop. $F^9$ is an adjusting sleeve whereby the tension of the spring may be varied.

G is a bracket mounted on the housing $F^5$. Rotatably mounted on this bracket is a bell-crank lever $G^1$ engaging at one end a set screw $G^2$ adjustably mounted in the end of the piston rod $F^8$. At the other end the lever passes between guides $G^3$ and is cut away as at $G^4$ to engage the mitered end $G^5$ of the trip lever $C^3$ whereby when the pressure in the pressure chamber $F^1$ exceeds a predetermined point the piston will be thrust back to rotate the bell-crank lever in a counter-clockwise direction, release the latch engaging with the trip lever and permit the weight to fall. $G^6$ is a stop ring in the housing and prevents its being completely blown out by any great excessive pressure.

It will be evident that while I have shown in my drawings an operative device, still many changes might be made both in size, shape and arrangement of parts without departing materially from the spirit of my invention and I wish, therefore, that my drawings be regarded as in a sense diagrammatic.

The use and operation of my invention are as follows:—

With the apparatus set up as shown in Fig. 1 the refrigerating plant or the pressure system will operate so long as the operation is normal without producing any effect on any of the controlling apparatus. If it should happen that the pressure in the plant drops down below a certain point owing to a leak or escape of the liquid or a blow out of the cylinder head or something of the sort, the spring on the low pressure release mechanism will no longer be overcome and the pressure will move the plunger, rotate the lever and release the latch. The weight will then fall and after it has fallen a short distance and gained momentum the cord will be jerked by the weight and the valve closed or the motor stopped as the case may be. This will take place without interference with any other parts and it will only be necessary for the operator when the difficulty is remedied to raise the weight until it latches and the operation can proceed.

If, however, the difficulty is in the nature of an excess pressure the other control will operate. The excess pressure spring will be overcome and the piston will be moved out to release the latch and the weight will fall and the stoppage will be effected as indicated above.

If, now, for some reason or other the operator himself wishes to stop the apparatus or to effect the control he reaches up and pulls on the hand ball and this causes the tripping power to become effective just as if one of the two heavy weighted levers had operated.

All the controlling cords are contained within the pipes or conduits passing over the pulleys or sheaves within the conduits so as to prevent undue frictional resistance. The result of the whole arrangement is that the cords are protected and cannot be cut or frayed and the workman cannot hang his coat or overalls on the cords so as to operate the device or so as to permit anything hung on them to foul the pulleys.

In refrigerating machinery where an expensive and dangerous fluid such as ammonia is used you must stop movement or shut off the valve or motor when the pressure becomes too high because if you fail to do this something will give way and waste and harm will ensue, or if the pipe does break and pressure drops down you must stop movement and shut off the pipe to prevent further waste of the fluid and therefore it is necessary for the safety device to operate whenever the pressure varies above or below the normal working pressure. It is, therefore, not only desirable, but necessary to stop the motor when the so-called maximum pressure is reached and it is also not only desirable but necessary to stop the motor when the pressure falls below the so-called minimum because this control is not a pressure control expected to control pressure between working limits but a stopping apparatus expected to stop operations when pressure becomes too high or too low.

I claim:

1. A safety control for pressure systems comprising a pressure transmitting device, an operating member leading therefrom, and automatic means for manipulating such member when the pressure is abnormal, said automatic means including a weight and a lost motion connection from the weight to the member whereby the weight in falling jerks the member.

2. A safety control for pressure systems comprising a pressure transmitting device, an operating member leading therefrom, separate hand controlled means for manipulating such member located therealong, and automatic means for manipulating such member when the pressure is abnormal, said automatic means including a weight and a lost motion connection from the weight to the member whereby the weight in falling jerks the member.

3. A safety control for pressure systems comprising a pressure transmitting device, an operating member leading therefrom, and automatic means for manipulating the member when the pressure is abnormal including means adapted to be first released then to move a certain distance to accumulate energy and then to jerk the member to operate the device.

4. A safety control for pressure systems comprising a pressure transmitting device, an operating member leading therefrom and automatic means for manipulating the member when the pressure is abnormal including a suspended weight, a release and a lost motion connection between the weight and the member so that the weight jerks the member to operate the device after it has fallen a predetermined distance.

5. A safety control for pressure systems comprising a pressure transmitting device, an operating member leading therefrom, and automatic means for manipulating the member when the pressure is abnormal, including a suspended weight, a latch whereby it is held in suspension, a release for the latch responsive to the pressure variations, and a lost motion connection between the weight and the member.

6. A safety control for pressure systems comprising a pressure transmitting device, an operating member leading therefrom, and automatic means for manipulating the member when the pressure is abnormal, including a suspended weight, a latch whereby it is held in suspension, a release for the latch responsive to the pressure variations, and a lost motion connection between the weight and the member comprising a stop associated with the member, and held in the path of a part which moves with the weight.

7. A safety control for pressure systems comprising a pressure transmitting device, an operating member leading therefrom, and automatic means for manipulating the member when the pressure is abnormal, including a weighted lever, a latch for supporting the weight, pressure controlled means for releasing the latch, and a lost motion connection between the weight and the member.

8. A safety control for pressure systems comprising a pressure transmitting device, an operating cord leading therefrom and automatic means including a weight for jerking the cord to operate the device when the pressure is abnormal.

9. A safety control for pressure systems comprising a pressure transmitting device, an operating cord leading therefrom and automatic means for jerking the cord to operate the device when the pressure is abnormal, said automatic means including a weight, a latch for suspending it, a pressure controlled release for the latch, and a lost motion connection between the member and the weight.

10. A safety control for pressure systems comprising a pressure transmitting device, an operating cord leading therefrom and automatic means for jerking the cord to operate the device when the pressure is abnormal, said automatic means including a weight, a latch for suspending it, a pressure controlled release for the latch, and a lost motion connection between the member and the weight, consisting of a stop on the end of the member and a hole in a part which moves with the weight which is smaller than the stop and through which the member passes.

11. A safety control system for pressure systems comprising a pressure transmitting device, an operating member leading therefrom, two automatic devices connected with such member and adapted each to operate it, one directly responsive to abnormally high pressure and the other to abnormally low pressure.

12. A safety control system for pressure systems comprising a pressure transmitting device, a cord leading therefrom, two automatic devices connected with such cord and adapted each to pull it so as to operate the safety device, one responsive to abnormally high pressure and the other to abnormally low pressure.

13. A safety control system for pressure systems comprising a pressure transmitting device, an operating member leading therefrom, two automatic devices connected with such member and adapted each to operate it, one responsive to abnormally high pressure and the other to abnormally low pressure, said automatic devices containing each a weight, means for suspending it, a release for the weight responsive to such abnormal pressure, and a lost motion connection between the weight and the operating member.

14. A safety control system for pressure systems comprising a pressure transmitting device, a cord leading therefrom, two automatic devices connected with such cord and adapted each to pull it so as to operate the safety device, one responsive to abnormally high pressure and the other to abnormally low pressure, said automatic devices containing each a weight, means for suspending it, a release for the weight responsive to such abnormal pressure, and a lost motion connection between the weight and the cord.

In testimony whereof, I affix my signature in the presence of two witnesses this ninth day of October 1917.

CHARLES C. HANSEN.

Witnesses:
 MINNIE M. LINDENAU,
 MARION L. INGRAHAM.